US009261578B2

(12) United States Patent
Im et al.

(10) Patent No.: US 9,261,578 B2
(45) Date of Patent: Feb. 16, 2016

(54) APPARATUS AND METHOD FOR CREATING PROBABILITY-BASED RADIO MAP FOR COOPERATIVE INTELLIGENT ROBOTS

(71) Applicant: Electronics and Telecommunications Research Institute, Daejeon-si (KR)

(72) Inventors: Hyun-Ja Im, Daejeon-si (KR); Chang-Eun Lee, Daejeon-si (KR); Min-Su Jang, Daejeon-si (KR); Dae-Ha Lee, Daejeon-si (KR); Seo-Hyun Jeon, Yongin-si (KR); Young-Jo Cho, Seongnam-si (KR); Sung-Hoon Kim, Daejeon-si (KR); Jong-Hyun Park, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 14/017,718

(22) Filed: Sep. 4, 2013

(65) Prior Publication Data
US 2014/0195049 A1    Jul. 10, 2014

(30) Foreign Application Priority Data

Jan. 4, 2013   (KR) .................. 10-2013-0001265

(51) Int. Cl.
*G01S 5/00* (2006.01)
*G01S 5/02* (2010.01)
*G05D 1/02* (2006.01)

(52) U.S. Cl.
CPC ............ *G01S 5/0252* (2013.01); *G05D 1/0274* (2013.01); *G05D 1/0291* (2013.01); *G05D 2201/0207* (2013.01); *Y10S 901/01* (2013.01)

(58) Field of Classification Search
CPC combination set(s) only.
See application file for complete search history.

(56) References Cited

U.S. PATENT DOCUMENTS

| 5,987,306 A * | 11/1999 | Nilsen .................. H04M 3/2254 455/423 |
| 8,180,486 B2 * | 5/2012 | Saito ..................... G01S 5/0252 700/245 |
| 8,374,721 B2 * | 2/2013 | Halloran ................... A47L 5/30 318/568.1 |
| 8,712,679 B1 * | 4/2014 | Mostofi .................. G09B 29/00 340/552 |
| 8,879,426 B1 * | 11/2014 | Quilling ................ H04W 40/20 370/245 |
| 8,930,023 B2 * | 1/2015 | Gutmann ............. G05D 1/0234 700/245 |
| 2002/0060267 A1 * | 5/2002 | Yavnai ................. G05D 1/0044 244/23 A |
| 2004/0017312 A1 * | 1/2004 | Anderson ................. G01S 5/02 342/457 |

(Continued)

FOREIGN PATENT DOCUMENTS

| JP | 2008-087102 A | 4/2008 |
| KR | 10-2002-0091530 A | 12/2002 |
| KR | 10-2012-0005192 A | 1/2012 |

*Primary Examiner* — Jonathan L Sample
(74) *Attorney, Agent, or Firm* — LRK Patent Law Firm

(57) ABSTRACT

An apparatus for creating a radio map includes a radio signal acquiring unit that acquires information on radio signals between one or more cooperative intelligent robots, a radio environment modeling unit that estimates radio strength for each cell configuring the radio map from the information on radio signals acquired by the radio signal acquiring unit, and a radio map creating unit that classifies a communication region of each cell and models the radio map according to the radio strength for each cell estimated by the radio environment modeling unit.

15 Claims, 4 Drawing Sheets

(56) References Cited

U.S. PATENT DOCUMENTS

| | | | |
|---|---|---|---|
| 2006/0213167 A1* | 9/2006 | Koselka | A01D 46/30 56/10.2 A |
| 2007/0061041 A1* | 3/2007 | Zweig | G05D 1/0261 700/245 |
| 2007/0112461 A1* | 5/2007 | Zini | G05B 19/41895 700/245 |
| 2008/0086236 A1* | 4/2008 | Saito | G01S 5/0252 700/245 |
| 2008/0263628 A1* | 10/2008 | Norman | G08C 17/02 726/1 |
| 2009/0198381 A1* | 8/2009 | Friedman | G05D 1/0274 700/259 |
| 2009/0234499 A1* | 9/2009 | Nielsen | B25J 9/161 700/250 |
| 2011/0105161 A1* | 5/2011 | Nilsson | G01S 5/0289 455/500 |
| 2012/0109420 A1* | 5/2012 | Lee | G05D 1/0274 701/2 |
| 2012/0197439 A1* | 8/2012 | Wang | B25J 9/1689 700/259 |
| 2013/0123981 A1* | 5/2013 | Lee | H04W 4/02 700/248 |
| 2013/0138246 A1* | 5/2013 | Gutmann | G05D 1/0231 700/253 |
| 2013/0170383 A1* | 7/2013 | Cho | G01S 5/0242 370/252 |

* cited by examiner

APPARATUS AND METHOD FOR CREATING PROBABILITY-BASED RADIO MAP FOR COOPERATIVE INTELLIGENT ROBOTS

CROSS-REFERENCE TO RELATED APPLICATION

This application claims the benefit under 35 U.S.C. §119 (a) of Korean Patent Application No. 10-2013-0001265, filed on Jan. 4, 2013, the entire disclosure of which is incorporated herein by reference for all purposes.

BACKGROUND

1. Field

The following description relates to cooperative intelligent robots, and particularly, to an apparatus and method for creating a probability-based radio map to provide information on communication capabilities, in order to estimate and prevent disconnection of communication between cooperative intelligent robots.

2. Description of the Related Art

As utilization of robots in daily life is increasing, research on robots in various fields is increasing. Various studies have found that utilizing a plurality of cooperative intelligent robots rather than a single robot is more efficient in cases where there are a wide range of complex tasks to be carried out. Accordingly, research on cooperative intelligent robots is actively progressing.

Fields such as construction, defense, security, disaster management, and emergency management are typical examples of fields capable of increasing task effectiveness by utilizing a plurality of cooperative intelligent robots. Since such fields involve non-formalized work environments, corresponding cooperative intelligent technologies are needed. Further, in such environments, since it is difficult to use an existing communication infrastructure, need for a cooperative intelligent network is increased, and a countermeasure for responding to disconnections of radio transmissions due to changes in the environment is required.

In performing tasks by such cooperative intelligent robots, the most basic function is communication between robots. In establishing a cooperation policy between robots, the ability of the robot to communicate is the biggest issue. In performing tasks such as search and rescue, construction of an uninterrupted network between robots is essential.

As existing communication systems for cooperative intelligent robots, a single-hop to communication system based on one access point (AP), or a multiple-hop routing, system using an ad-hoc mesh network, are being researched. However, in case of the single-hop communication based on one access point, a communication radius is limited, and in case of the ad-hoc mesh network, communication obstacles caused by changes in radio waves are frequent, disconnecting communications in the area.

SUMMARY

The following description relates to an apparatus and method for creating a probability-based radio map so that cooperative intelligent robots can secure and recognize regions where communication is possible.

In one general aspect, there is provided an apparatus for creating a radio map, including: a radio signal acquiring unit that acquires information on radio signals between one or more cooperative intelligent robots; a radio environment modeling unit that estimates radio strength for each cell configuring the radio map from the information on radio signals acquired by the radio signal acquiring unit; and a radio map creating unit that classifies a communication region of each cell and models the radio map according to the radio strength for each cell estimated by the radio environment modeling unit.

In another general aspect, there is provided a method of creating a radio map in a leader robot among one or more routing robots, including: acquiring information on radio signals between one or more cooperative intelligent robots; estimating radio strength for each cell configuring the radio map from the acquired information on radio signals; and classifying a communication region of each cell and modeling the radio map according to the estimated radio strength for each cell.

Other features and aspects will be apparent from the following detailed description, the drawings, and the claims.

Figure 1:
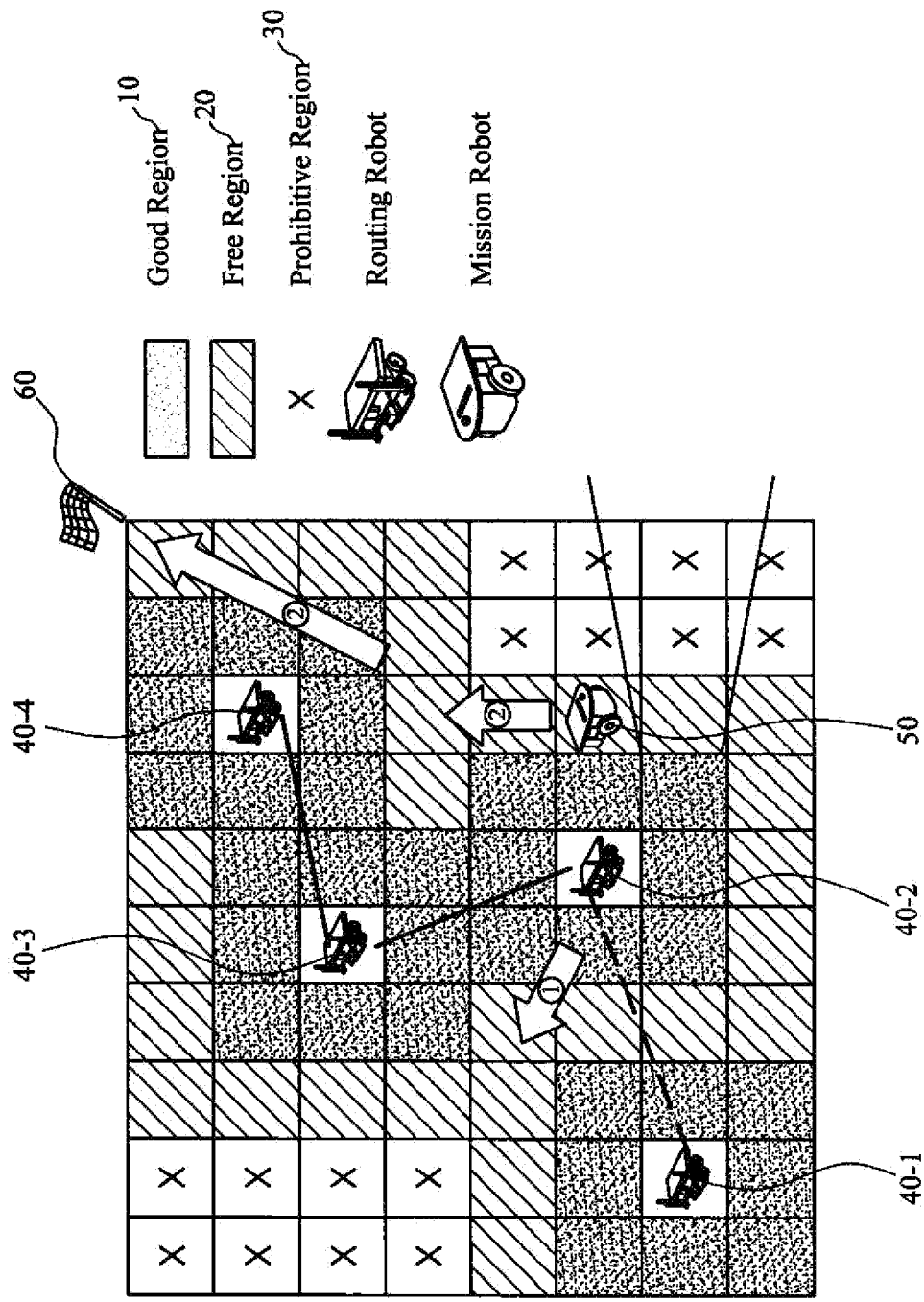
FIG. 1 is a conceptual diagram of a probability-based radio map of cooperative intelligent robots according to an embodiment of the invention.

Throughout the drawings and the detailed description, unless otherwise described, the same drawing reference numerals will be understood to refer to the same respective elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Various changes, modifications, and equivalents of the methods, apparatuses, and/or systems described herein will suggest themselves to those of ordinary skill in the art. Also, descriptions of well-known functions and constructions may be omitted for increased clarity and conciseness.

Below, a specific example for implementing the invention will be described in detail with reference to the accompanying drawings.

FIG. 1 is a conceptual diagram of a probability-based radio map of cooperative intelligent robots according to an embodiment of the invention.

Referring to FIG. 1, the radio map is a map having a form in which a predetermined region in which one or more cooperative intelligent robots are positioned is divided into a plurality of grid cells, and radio strength is indicated on each grid cell. Here, the radio strength may be represented with an absolute number value, or as illustrated in FIG. 1, the radio strength may be classified depending on its magnitude. FIG. 1 illustrates an example of classification into a communication good region 10, a communication free region 20, and a communication prohibitive region 30.

Meanwhile, robots can generally be classified into routing robots 40-1, 40-2, 40-3, and 40-4 which are configured to perform signal routing, and a mission robot 50 configured to perform a specific task.

The routing robots 40-1, 40-2, 40-3, and 40-4 move in a direction in which communication between robots is not disconnected using the radio map. For example, in FIG. 1, radio disconnection can be prevented when the routing robots 40-1, 40-2, 40-3, and 40-4 are connected through the communication good region 10, but when the communication good region 10 between the routing robot 40-1 and the routing robot 40-2 is cut off, the routing robot 40-2 recognizes the possibility of radio disconnection between robots. Accordingly, the routing robot 40-2 moves in a direction of ① to prevent this. To this end, a potential field-based behavior control algorithm based on radio strength between each of the robots can be utilized.

The mission robot 50 searches for an optimum path (or the shortest distance) to move to a predetermined target point within a communication free region using the radio map. That is, using the radio map as shown in FIG. 1, the mission robot 50 defines allowable movement paths as paths through the communication good region 10 and the communication free region 20 only, to and then searches for the optimum path to the target point 60 and moves there. In FIG. 1, ② denotes the optimum path to the target point 60 within a communication available range.

Meanwhile, the routing robots include a leader robot (L-Bot) and a follower robot (F-Bot). The L-bot is configured to handle all of the routing robots and create and share the radio map based on the radio strength acquired from the F-Bots according to an embodiment of the is invention. Herein, the L-Bot may become a mobile robot configured to perform a routing function and may become a remote operating center (ROC) configured to monitor everything.

Figure 2:
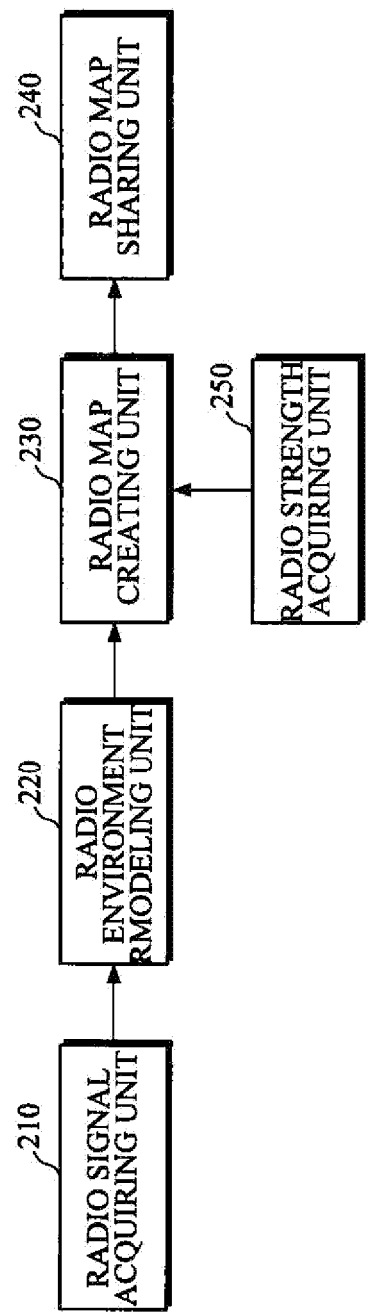
FIG. 2 is a configuration diagram of an apparatus for creating a probability-based radio map for cooperative intelligent robots according to an embodiment of the invention.

FIG. 2 is a diagram of an apparatus for creating a probability-based radio map for cooperative intelligent robots according to an embodiment of the invention.

Referring to FIG. 2, the apparatus for creating a radio map includes a radio signal acquiring unit 210, a radio environment modeling unit 220 and a radio map creating unit 230. Additionally, a radio map sharing unit 240 and a radio strength acquiring unit 250 are also included therein.

The radio signal acquiring unit 210 acquires information on radio signals between the cooperative intelligent robots. To this end, the radio signal acquiring unit 210 carries a wireless personal area network (WPAN) communication module and receives information on radio signals from neighboring robots. Here, the information on received radio signals includes radio strength, communication link quality, relative position information of the neighboring robots, and the like.

The radio environment modeling unit 220 estimates radio strength for each cell configuring the radio map from the acquired information on radio signals. This will be described in detail below.

The radio map creating unit 230 classifies a communication region of each cell according to the estimated radio strength of each cell and models the radio map. This will be described in to detail with reference to FIG. 3. Further, the radio map is made to match a grid of an actual local map.

The radio map sharing unit 240 transmits the radio map created by the radio map creating unit 230 to the neighboring one or more routing robots and mission robots so that the mobile robots may share the radio map.

The radio strength acquiring unit 250 acquires the information on radio strength estimated by the neighboring one or more robots (F-Bots) and inputs it to the radio map creating unit 230. According to an embodiment of the invention, one or more follower robots (F-Bots) include the aforementioned radio signal acquiring unit 210 and the radio environment modeling unit 220 and are thereby able to estimate radio strength for each cell of the radio map. Accordingly, a number of estimated radio strength values for each cell of the radio map corresponding to the number of routing robots located on the radio map may be created. The follower robots (F-Bots) transmit the information on the estimated radio strength to the leader robot. Then the radio map creating unit 230 extracts a representative value from among the radio strengths in consideration of robot priority.

Next, estimating radio strength by the radio environment modeling unit 220 will be described in detail.

The radio environment modeling unit 220 estimates radio strength for each cell configuring the radio map using information acquired by the radio signal acquiring unit 210 and s the following Equation 1.

$$L = L_0 - 10 \log n \left( d \frac{4\pi}{\lambda} \right) \qquad \text{Equation 1}$$

Equation 1 represents a log distance channel model, wherein L is received power (rssi) in the robot, $L_0$ means the received power at a point of 1 m from the robot, d is a distance between a to location at which the received power is measured and the robot, λ means a wavelength of a radio signal, and n is an environment parameter and is set to a value estimated per every period.

First, the radio environment modeling unit 220 estimates a radio environment variable (n) through a filter (for example, a Kalman filter) designed in consideration of Equation 1 that is a relationship between a movement distance of each robot and the strength of the acquired radio is signal. That is, the radio environment modeling unit 220 acquires $L_0$, d, λ, and L from the radio signal acquiring unit 210 and calculates the value of n using Equation 1. Further, using the calculated n value, the value of L is estimated while changing the value of d in Equation 1. That is, if the distance value (d) from the robot to one or more grid cells configuring the radio map changes, the L value in each grid cell is estimated. Here, for noise modeling, a maximum likelihood estimate (MLE) technique can be used to estimate average noise and a Cramer-Rao bound technique can be used to estimate a noise distribution.

Next, how the radio map creating unit 230 performs communication region classification for each cell according to the estimated radio strength for each cell will be described with reference to FIG. 3.

Figure 3:
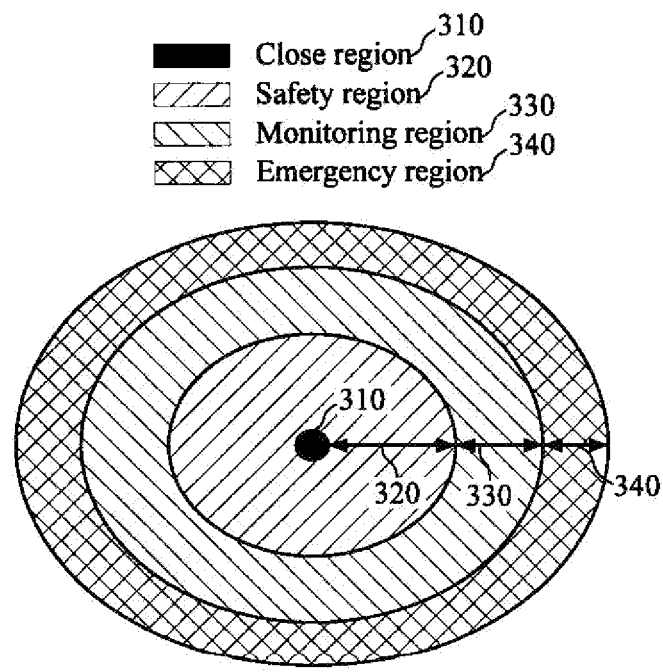
FIG. 3 is a diagram for describing communication region classification according to an embodiment of the invention.

FIG. 3 is a diagram for describing communication region classification according to an embodiment of the invention.

Referring to FIG. 3, communication regions can be classified into a close region, a safety region, a monitoring region, an emergency region and a prohibition region according to radio strength. It can be seen that this classification scheme has more subdivisions than that in the radio map illustrated in FIG. 1.

In the close region, which is close to the routing robot, a communication state is the best and radio strength (rssi) is greater than or equal to a predetermined value Max. In the safety region, the communication state is safe from disconnection and the radio strength (rssi) is less than or equal to Max and greater than a predetermined value Min. In the monitoring region, the communication state should be monitored for disconnections and the radio strength (rssi) is less than or equal to Min and greater than a predetermined value Emer. In the emergency region, the communication state is deteriorated and a probability of disconnection is high, and the radio strength (rssi) is less than or equal to Emer and greater than a predetermined value PRH. In the prohibition region, communication is impossible and the radio strength (rssi) is less than PRH. Here, Max, Min, Emer, and PRH can be obtained from specifications or experimentally according to a kind of a wireless sensor.

Figure 4:
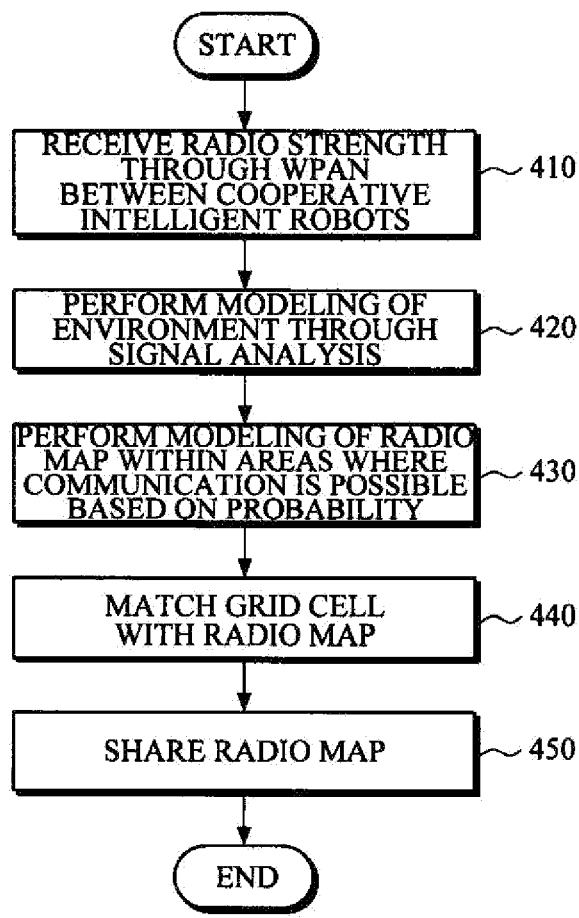
FIG. 4 is a flowchart illustrating a method of creating a probability-based radio map for cooperative intelligent robots according to an embodiment the invention.

FIG. 4 is a flowchart illustrating a method of creating a probability-based radio map for cooperative intelligent robots according to an embodiment of the invention.

Referring to FIG. 4, the apparatus for creating a radio map acquires information on radio signals between the cooperative intelligent robots m operation 410. To this end, the WPAN communication module is mounted on the robots and thereby the information on radio signals is received from neighbor robots. Here, the received information on radio signals includes radio strength, communication link quality, relative positions of the neighboring robots, and the like.

The apparatus for creating a radio map estimates the radio strength for each cell s configuring the radio map from the acquired information on radio signals in operation 420. Operation 420 specifically includes estimating the radio environment variable (n) through the filter (for example, a Kalman filter) designed in consideration of the above Equation 1 which is a relationship between the acquired movement distance of each robot and the acquired radio strength, and estimating the L value for each cell configuring the radio map while changing the d to value in Equation 1 using the estimated radio environment variable (n). Then, according to an embodiment of the invention, a number of estimated values of the radio strength for each cell corresponding to the number of routing robots located on the radio map may be obtained. Further, for noise modeling, a maximum likelihood estimate (MLE) technique can be used to estimate average noise and a Cramer-Rao bound technique can be used to estimate a noise distribution.

The apparatus for creating a radio map classifies the communication region of each cell and models the radio map according to the estimated radio strength for each cell in operation 430. At this time, the apparatus for creating a radio map can receive information on radio strength from one or more follower robots and extract a representative value from among radio strengths in consideration of robot priority.

The apparatus for creating a radio map matches the created radio map with a grid of an actual local map in operation 440. Then, the apparatus for creating a radio map transmits the created radio map to the follower routing robot and the mission robot in operation 450 so that they can share it.

Then, each robot performs a robot behavior control algorithm in consideration of a communication radius. That is, the routing robot moves in a direction in which communication is not interrupted using the radio map. To this end, a potential field-based behavior control algorithm based on radio strength between robots can be utilized. The mission robot searches for the optimum (or the shortest distance) path for moving to a determined target point in a communication free region using the radio map and moves there.

While the present invention has been described with reference to exemplary embodiments, it is to be understood that the invention is not limited to the disclosed exemplary embodiments and various modifications are possible. The scope of the following claims is to be accorded the broadest possible interpretation so as to encompass all such modifications and equivalent structures and functions.

The present invention can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and optical data storage. Further, the recording medium may be implemented in the form of carrier waves such as in Internet transmission. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for creating a radio map in a communication system for cooperative intelligent robots including one or more routing robots for performing signal routing and a mission robot for performing a task, the apparatus being included in a leader robot of the one or more routing robots and comprising:
   a radio signal acquiring unit that acquires information on radio signals between the cooperative intelligent robots;
   a radio environment modeling unit that estimates radio strength for each cell of the radio map from the information on radio signals acquired by the radio signal acquiring unit; and
   a radio map creating unit that classifies a communication region of each cell and models the radio map according to the radio strength for each cell estimated by the radio environment modeling unit,
   wherein the one or more routing robots are cooperatively operated to securely establish an uninterrupted network between the cooperative intelligent robots by using the radio map to move to a communication region where communication between the cooperative intelligent robots is not disconnected, and
   wherein the mission robot is configured to use the radio ma to search for a shortest path to a target in the communication region and move to the target.

2. The apparatus of claim 1, wherein the radio signal acquiring unit carries a WPAN communication module and receives the information on radio signals from one or more neighboring robots.

3. The apparatus of claim 1, wherein the information on radio signals includes radio strength, communication link quality, and a relative position.

4. The apparatus of claim 1, wherein the radio map creating unit matches the radio map with a grid of an actual local map.

5. The apparatus of claim 1, wherein the radio environment modeling unit calculates a radio environment variable (n) using an acquired movement distance of each robot and an acquired radio strength, and estimates a radio strength (L) in each grid cell while changing a distance value (d) to one or more grid cells of the radio map using the calculated radio environment variable (n).

6. The apparatus of claim 1, wherein the radio environment modeling unit uses a maximum likelihood estimate (MLE) technique to estimate an average noise for noise modeling.

7. The apparatus of claim 1, wherein the radio environment modeling unit uses a Cramer-Rao bound technique to estimate a noise distribution.

8. The apparatus of claim 1, wherein the radio map creating unit receives a radio strength estimation value for each cell of the radio map from one or more other routing robots, and extracts a representative value from among radio strengths in consideration of a priority of the routing robots.

9. The apparatus of claim 1, further comprising a radio map sharing unit that transmits the created radio map to the one or more routing robots and the mission robots.

10. A method of creating a radio map in a communication system for cooperative intelligent robots including one or more routing robots for performing signal routing and a mission robot for performing a task, the method being performed in a leader robot of the one or more routing robots and comprising:
    acquiring information on radio signals between the cooperative intelligent robots;
    estimating radio strength for each cell of the radio map from the acquired information on radio signals; and
    classifying a communication region of each cell and modeling the radio map according to the estimated radio strength for each cell,
    wherein the one or more routing robots are cooperatively operated to securely establish an uninterrupted network between the cooperative intelligent robots by using the radio map to move to a communication region where communication between the cooperative intelligent robots is not disconnected, and
    wherein the mission robot is configured to use the radio map to search for a shortest path to a target in the communication region and move to the target.

11. The method of claim 10, wherein the information on radio signals includes radio strength, communication link quality, and a relative position.

12. The method of claim 10, further comprising matching the radio map with a grid of an actual local map.

13. The method of claim 10, wherein the estimating of the radio strength includes:
    calculating a radio environment variable (n) using an acquired movement distance of each robot and radio strength, and
    estimating a radio strength value (L) in each grid cell while changing a distance value (d) to one or more grid cells of the radio map using the calculated, radio environment variable (n).

14. The method of claim 10, wherein the creating of the radio map includes:
    receiving a radio strength estimation value for each cell of the radio map from one or more other routing robots, and
    extracting a representative value from among radio strengths in consideration of a priority of the routing robots.

15. The method of claim 10, further comprising transmitting the created radio map to the one or more routing robots and the mission robot.

* * * * *